United States Patent [19]
Yoshida

[11] Patent Number: 5,227,894
[45] Date of Patent: Jul. 13, 1993

[54] IMAGE TRANSMISSION APPARATUS WITH SHEET NUMBER CHECKING

[75] Inventor: Takehiro Yoshida, Tokyo, Japan

[73] Assignee: Canon Kabushiki Kaisha, Tokyo, Japan

[21] Appl. No.: 933,576

[22] Filed: Aug. 21, 1992

Related U.S. Application Data

[63] Continuation of Ser. No. 696,177, May 6, 1991, abandoned.

[30] Foreign Application Priority Data

May 10, 1990 [JP] Japan .................. 2-118668

[51] Int. Cl.[5] ............................................. H04N 1/00
[52] U.S. Cl. .................................................. 358/441
[58] Field of Search ............................. 358/441–442, 358/448, 449, 404, 444; 340/500–501, 506

[56] References Cited

U.S. PATENT DOCUMENTS

| | | | |
|---|---|---|---|
| 4,670,791 | 6/1987 | Murata et al. | 358/441 |
| 4,772,955 | 9/1988 | Kurayayashi et al. | 358/257 |
| 4,811,385 | 3/1989 | Watanabe | 359/100 |
| 4,827,349 | 5/1989 | Ogata et al. | 358/256 |
| 4,845,569 | 7/1989 | Kurahayashi et al. | 358/400 |
| 4,894,843 | 1/1990 | Yoshida et al. | 375/8 |

FOREIGN PATENT DOCUMENTS

| | | |
|---|---|---|
| 3014660 | 10/1980 | Fed. Rep. of Germany . |
| 57-148459 | 9/1982 | Japan . |
| 63-104575 | 5/1988 | Japan . |
| 3-027663 | 2/1991 | Japan . |

*Primary Examiner*—Stephen Brinich
*Attorney, Agent, or Firm*—Fitzpatrick, Cella, Harper & Scinto

[57] ABSTRACT

An image transmission apparatus for transmitting image data of document sheets stored in an image memory includes a manual entry device entering the number of document sheets. A counter counts the number of pages of document image stored in the image memory. The numbers are compared and an alarm is generated when the numbers are not equal.

6 Claims, 6 Drawing Sheets

IMAGE TRANSMISSION APPARATUS WITH SHEET NUMBER CHECKING

This application is a continuation of application Ser. No. 07/696,177 filed May 6, 1991, now abandoned.

BACKGROUND OF THE INVENTION

1. Field of the Invention

The present invention relates to an image communication apparatus, and more particularly to an image communication apparatus which reads image data of a document sheet to be transmitted before the line connection, stores it in an image memory and sends the image data of the document sheet stored in the image memory to a designated destination.

2. Related Background Art

A facsimile device which reads an image of a document sheet, store it in an image memory and sends the image data of the document sheet stored in the image memory has been known. Patents relating to such a facsimile device are U.S. Pat. Nos. 4,811,385; 4,772,955; 4,845,569 and 4,827,349.

A facsimile device in which the number of sheets of document is entered by keys when the document sheets are read for transmission, and the number of sheets actually sent is compared with the entered number of sheets of document, and if the number of sheets of document actually sent is different from the entered number of document sheets, an alarm is generated, has also been known. A patent application relating to such a facsimile device is Japanese Laid-Open Patent Application No. 57-148459 (laid open on Sep. 13, 1982). However, in such a facsimile device with the check function of the number of sheets, the number of sheets is checked when the document sheets are sent while they are read (direct transmission) and the number of sheets is not checked in the memory transmission. In the memory transmission, the document sheet is read into the memory before the line connection. Accordingly, the work by the user is rapid and the check of the number of document sheets to be transmitted can be more effectively done by the user by checking them while the document sheets are read.

However, in the memory transmission, many users return to their seats without checking the read condition and the missing of the pages can be first detected when the user checks an output report at the end of communication. In this case, the user may be obliged to confirm to the destination station by phone.

SUMMARY OF THE INVENTION

In the light of the above, it is an object of the present invention to improve an image communication apparatus.

It is another object of the present invention to provide an image communication apparatus having a memory transmission function, which checks the number of pages of image data stored in a memory when the image data is stored into the memory.

It is another object of the present invention to provide an image communication apparatus which, in the memory transmission mode, compares the number of document sheets entered by keys and the number of pages of image actually stored in the memory, and generates an alarm when they are not equal.

It is another object of the present invention to provide an image communication apparatus which, in the memory transmission mode, compares the number of document sheet entered by keys and the number of pages of image actually stored in the memory, and generates an alarm and stops the transmission when they are not equal.

Other objects of the present invention will be apparent from the following detailed description of the embodiments and the accompanying drawings.

BRIEF DESCRIPTION OF THE DRAWINGS

FIGS. 2A-1 to 2C show flow charts of a control operation of a control circuit in the embodiment.

DETAILED DESCRIPTION OF THE PREFERRED EMBODIMENT

One embodiment of the present invention is now explained in detail with reference to the drawings.

Figure 1:
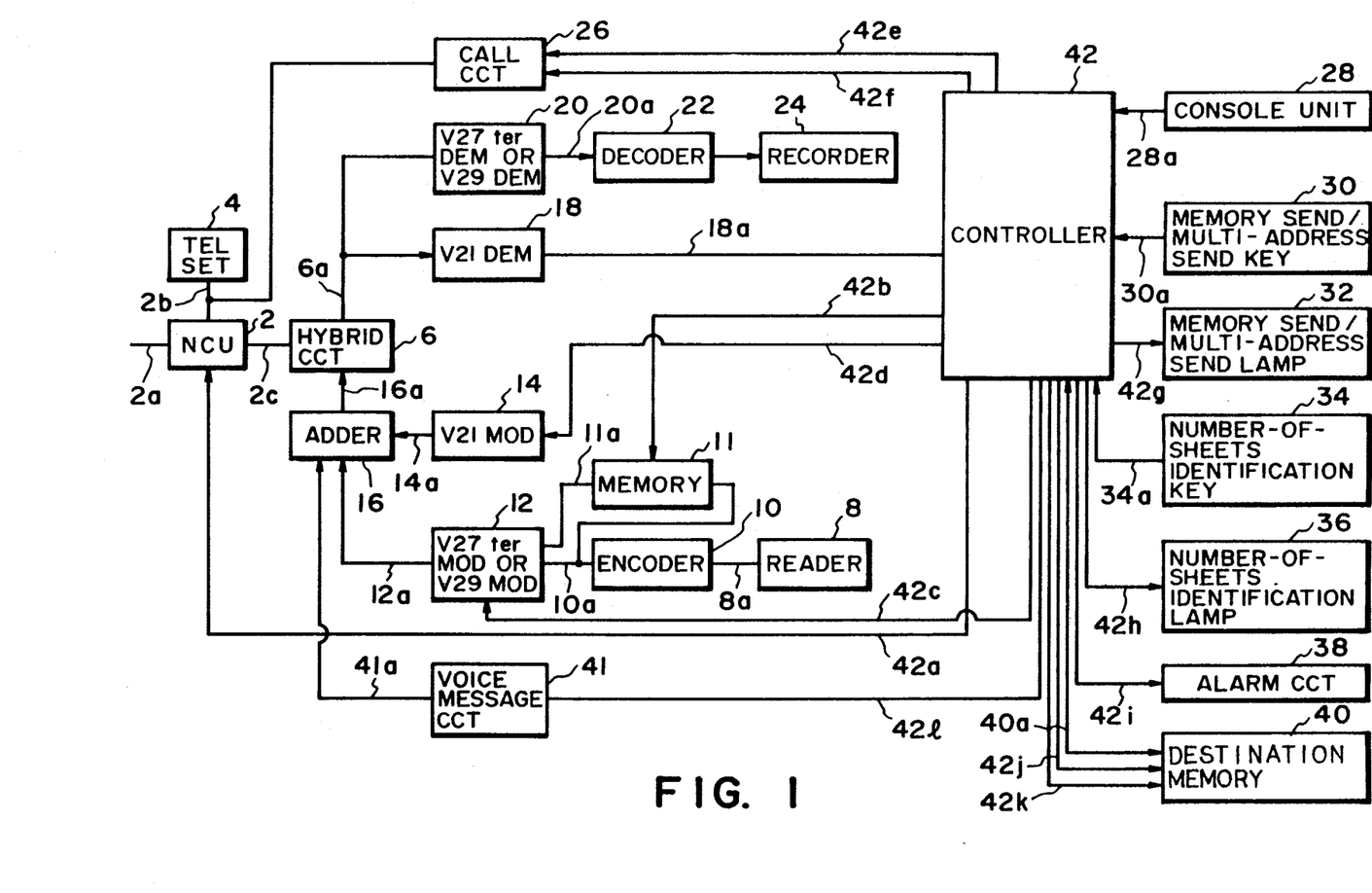
FIG. 1 shows a block diagram of a facsimile device in one embodiment of the present invention.

FIG. 1 shows a block diagram of a facsimile device of the present embodiment. In FIG. 1, numeral 2 denotes a network control unit (NCU) which is connected to a terminal of a line in order to use a telephone network for data communication to control the connection of the telephone switch network, switch the line to a data communication line or hold a loop. Numeral 2a denotes a telephone line.

The NCU 2 receives a signal on a signal line 42a. When a signal level thereof is "0", it connects the telephone line to a telephone set, that is, it connects the signal line 2a to a signal line 2b. If the signal level of the signal on the signal line 42a is "1", it connects the telephone line to the facsimile device, that is, it connects the signal line 2a to a signal line 2c. In a normal stat, the telephone line is connected to the telephone set.

Numeral 6 denotes a hybrid circuit which isolates a transmitting signal from a received signal. The transmitting signal on a signal line 16a goes through the signal line 2c and the NCU 2 and is sent out to the telephone line. A signal sent from a sending station goes through the NCU 2 and the signal line 2c and is sent to a signal line 6a.

Numeral 8 denotes a reader which sequentially reads one scan line of image signal from the transmitting document sheet to generate signal trains representing black and white binary values. It may comprise an imaging device such as a charge coupled device (CCD) and an optical system. The black and white binary signal trains are supplied to a signal line 8a.

A numeral 10 denotes an encoder which receives data on the signal line 8a and produces MH (modified Huffman) encoded or MR (modified READ) encoded data on a signal line 10a.

Numeral 11 denotes a memory for storing the encoded data supplied to the signal line 10d. The signal stored in the memory 11 is supplied to a signal line 11a. The reading and writing from and to the memory 11 is controlled by a pointer on a signal line 42b.

A numeral 12 denotes a modulator which modulates in accordance with the CCITT Recommendation V27 ter (differential phase modulation) or V29 (quadrature modulation). When the signal level of a signal on a signal line 42c is "0", the modulator 12 receives the signal on the signal line 10a for modulation, and when the signal level of the signal on the signal line 42c is "1", the modulator 12 receives the signal on the signal line 11a, and supplies the modulated data to the signal line 12a.

Numeral 14 denotes a modulator which modulates in accordance with the CCITT Recommendation V21. The modulator 14 receives a protocol signal on a signal line 42d for modulation and supplies the modulated data to a signal line 14a.

Numeral 16 denotes an adder which receives signals on the signal lines 12a, 14a and 41a and supplies a sum signal to a signal line 16a.

Numeral 18 denotes a demodulator which demodulates in accordance with the CCITT Recommendation V21. The demodulator 18 receives a signal on a signal line 6a for V21 demodulation and supplies the demodulated data to a signal line 18a.

Numeral 20 denotes a demodulator which demodulates in accordance with the CCITT Recommendation V27 ter (differential phase modulation) or V29 (quadrature modulation). The demodulator 20 receives the signal on the signal line 6a for demodulation and supplies the demodulated data to a signal line 20a.

Numeral 22 denotes a decoder which receives the demodulated data on the signal line 20a, and supplies MH (modified Huffman) decoded or MR (modified READ) decoded data to a signal line 22a.

Numeral 24 denotes a recorder which receives the decoded data on the signal line 22a and record it sequentially line by line.

Numeral 26 denotes a calling circuit. When a call command pulse is issued to a signal line 42f, the calling circuit 26 receives the information on a signal line 42e and supplies a selection signal to a signal line 2b.

Numeral 28 denotes a console unit which comprises known keys such as ten-key, one-touch keys, start key, alphabet keys, and "*" and "#" keys. When the keys are depressed, the information is outputted to a signal line 28a.

Numeral 30 denotes a memory transmission/multi-address transmission key. When the key 30 is depressed, a pulse is generated on a signal line 30a.

Numeral 32 denotes a memory transmission/multi-address transmission lamp. When the signal level of a signal on a signal line 42g is "0", the lamp 32 is extinguished, and when the signal level is "1", the lamp is lit.

Numeral 34 denotes a read count check (or number-of-sheets identification) key. When the key 34 is depressed, a pulse is generated on a signal line 34a.

Numeral 36 denotes a read count check (or number-of-sheets identification) lamp. When the signal level of a signal on a signal line 42h is "0", the lamp 36 is extinguished, and when the signal level is "1", the lamp 36 is lit.

Numeral 38 denotes a count alarm generator. When the signal level of a signal on a signal line 42i is "0", no alarm is generated, and when the signal level is "1", an alarm is generated.

Numeral 40 denotes a memory for storing a destination to be called when the preset number of sheets and the number of sheets actually read are not equal. When a telephone number is to be stored in the destination memory 40, the telephone number is supplied to a signal line 40a and a write pulse is generated on a signal line 42j. When the telephone number stored in the destination memory 40 is to be read, a read pulse is generated on a signal line 42k so that the stored telephone number is read out to the signal line 40a.

Numeral 41 denotes a voice circuit which generates voice of "The number of sheets read is not equal" to a signal line 41a when a pulse is generated on a signal line 42l.

Numeral 42 denotes a control circuit which may comprise a microprocessor to control the respective units to control the transmission in the following manner.

An operation of an operator to check the number of sheets read in the present embodiment is now explained.

The direct transmission, that is, the operation in which the reading and the transmission of the image are carried out while the line is connected is first explained.

In this transmission mode, the user depress the read count check key 34 to light the read count check lamp 36 to activate the function of the present embodiment.

The user enters the number of sheets to be read or the number of sheets to be transmitted through the ten-key of the console unit 28. The user then depresses the start key to complete the entry of the number of sheets to be read or the number of sheets to be transmitted.

The user then calls through the ten-key, one-touch key or preset key (or abbreviation key) of the console unit 28.

During the transmission, the control circuit 42 counts the number of sheets actually transmitted. At the end of the transmission, the preset number of sheets to be read and the number of sheets actually transmitted are compared. If they are not equal, the sheet count alarm 38 is activated. If the numbers are equal, the process is terminated in a normal state.

The control for the memory transmission or the multi-address transmission in which the transmitting document image is stored into the memory is now explained.

The memory transmission/multi-address transmission key 30 is depressed to light the memory transmission/multi-address transmission lamp 32 and select the memory transmission/multi-address transmission mode.

Then, the read count check key 34 is depressed to light the read count check lamp 36 to activate the function of the present invention.

The number of sheets to be read is entered through the ten-key of the console unit 28. Then, the start key is depressed to complete the entry of the number of sheets to be read.

The destination station is designated by the one-touch dialing key, preset dialing key or ten-key of the console unit 28.

When a plurality of destination stations are entered, the multi-address transmission mode is selected. When one destination station is selected, the memory transmission mode is selected. The designation of the destination by the ten-key should be only one station and the final destination. When the start key is depressed or if no key is depressed for more than 5 seconds, a document storage process is started.

In the document storage process, the document image read by the reader 8 is stored into the memory 11. The number of pages stored into the memory 11 is counted.

After all document sheets have been stored, the preset number of sheets to be read and the number of sheets actually stored are compared. If the numbers are not equal, the count alarm is activated and the calling operation is not started.

The information stored in the memory 11 is assigned with a communication number and it can be erased from the memory 11 or read from the memory 11. The information stored in the memory 11 can also be transmitted by designating the communication number.

Figure 2A:
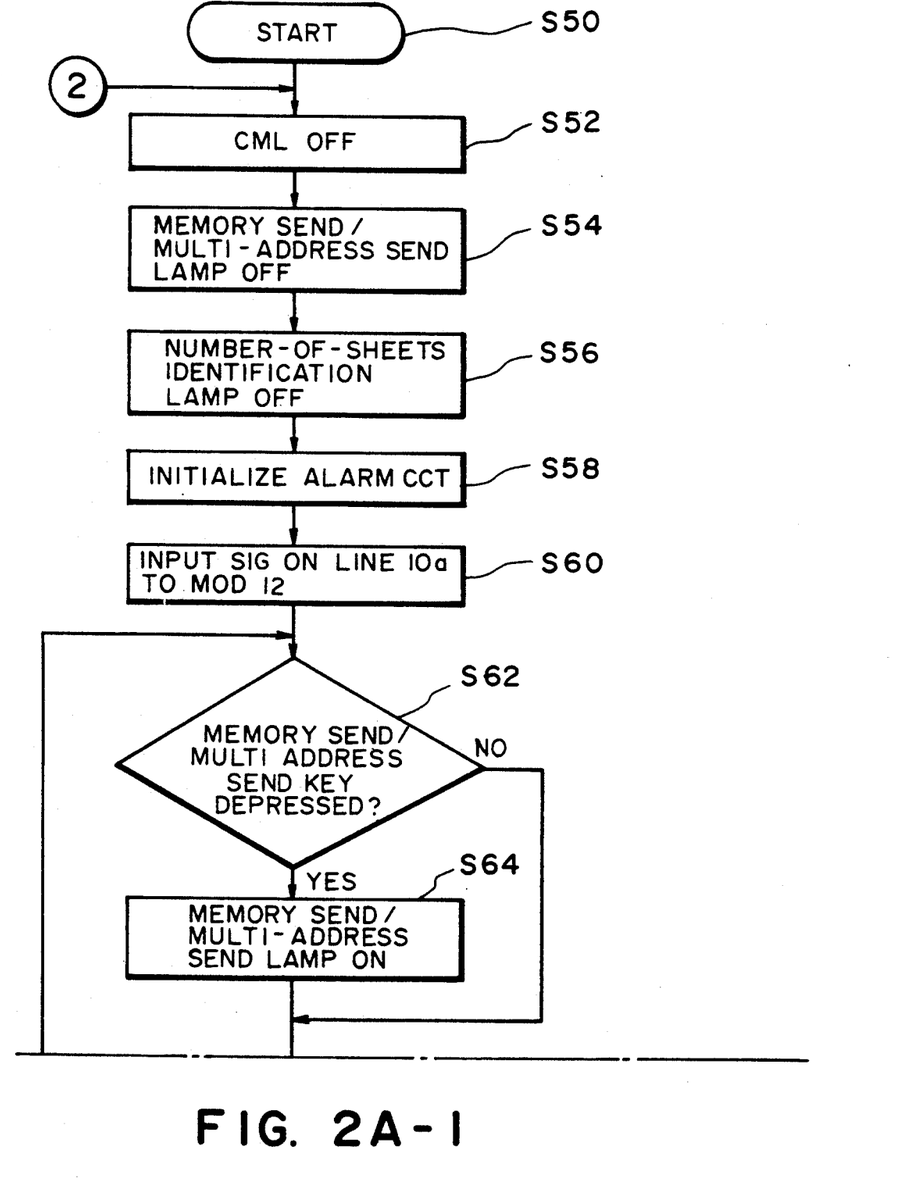
Figures 2A, 2A:
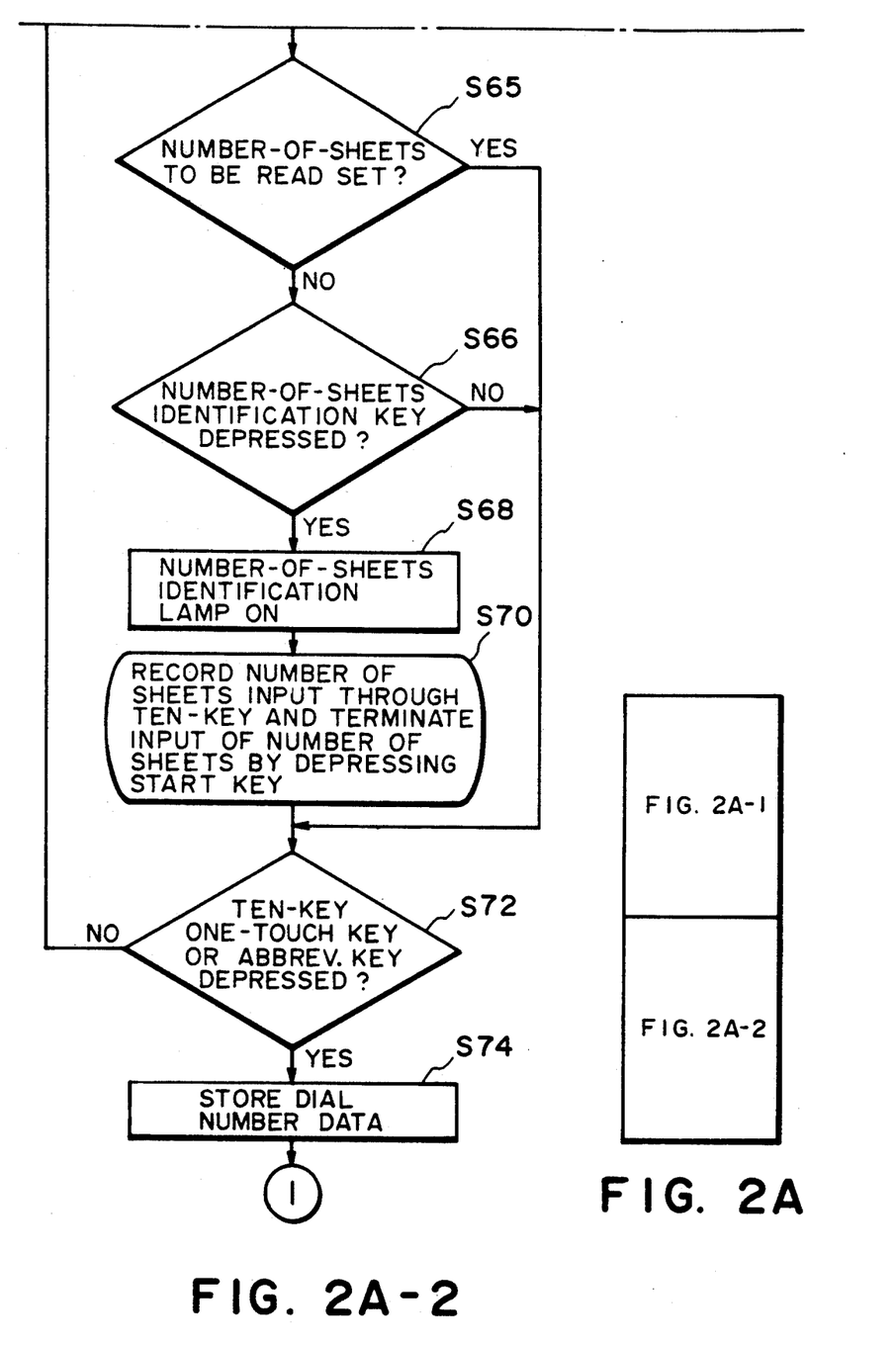
Figure 2B:
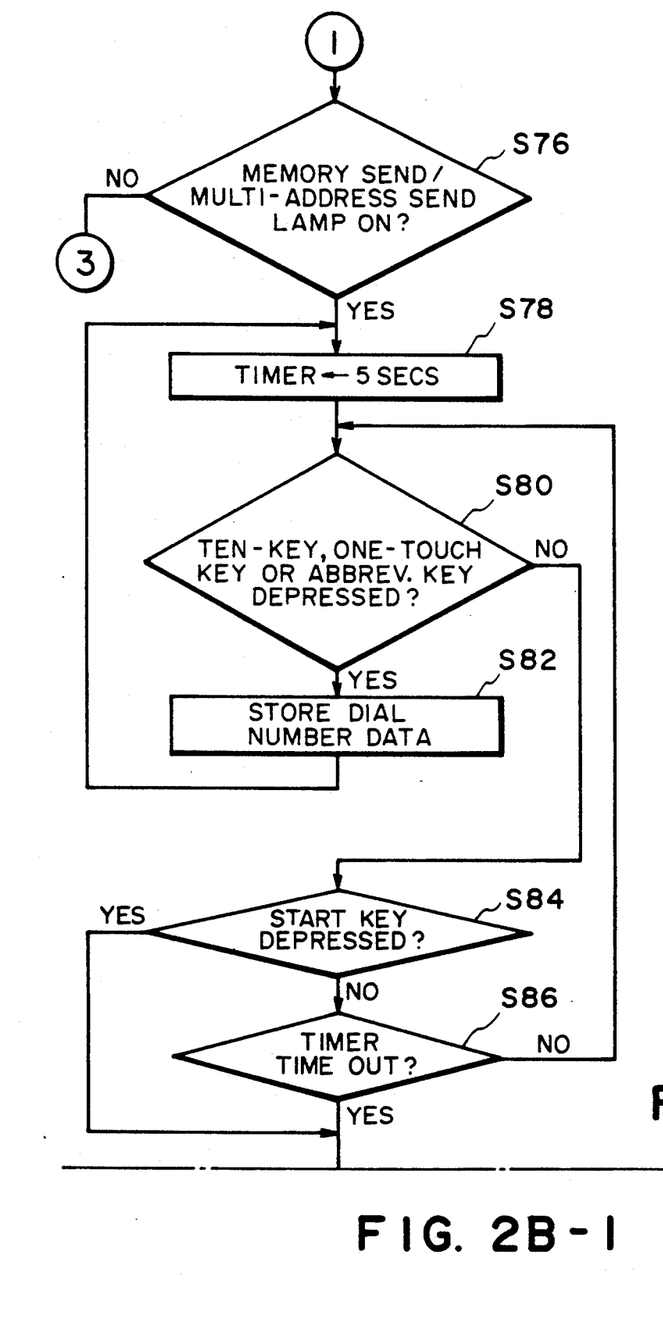
Figure 2B:
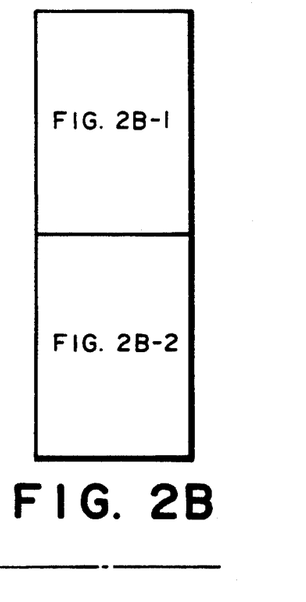
Figure 2B:
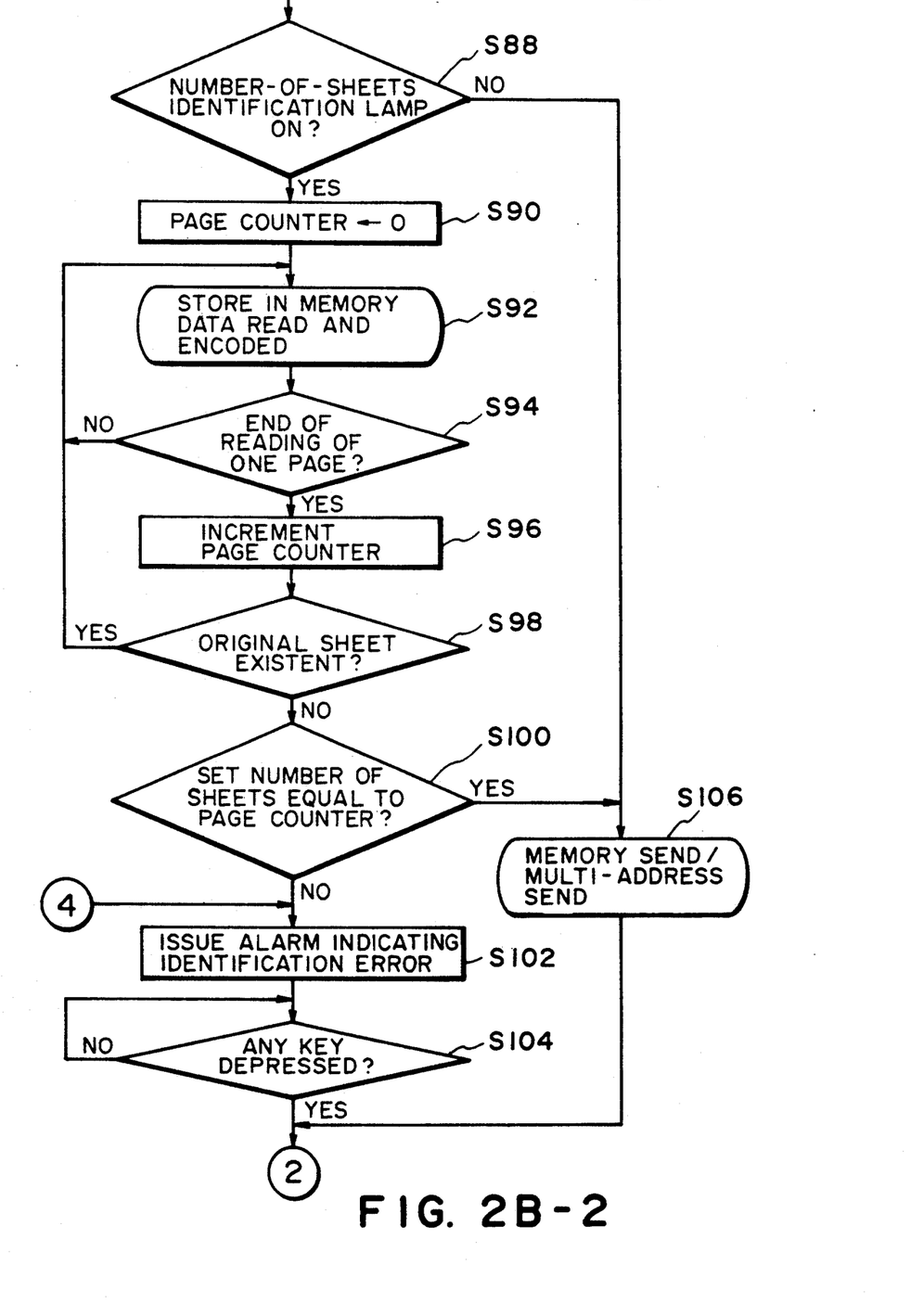
Figure 2C:
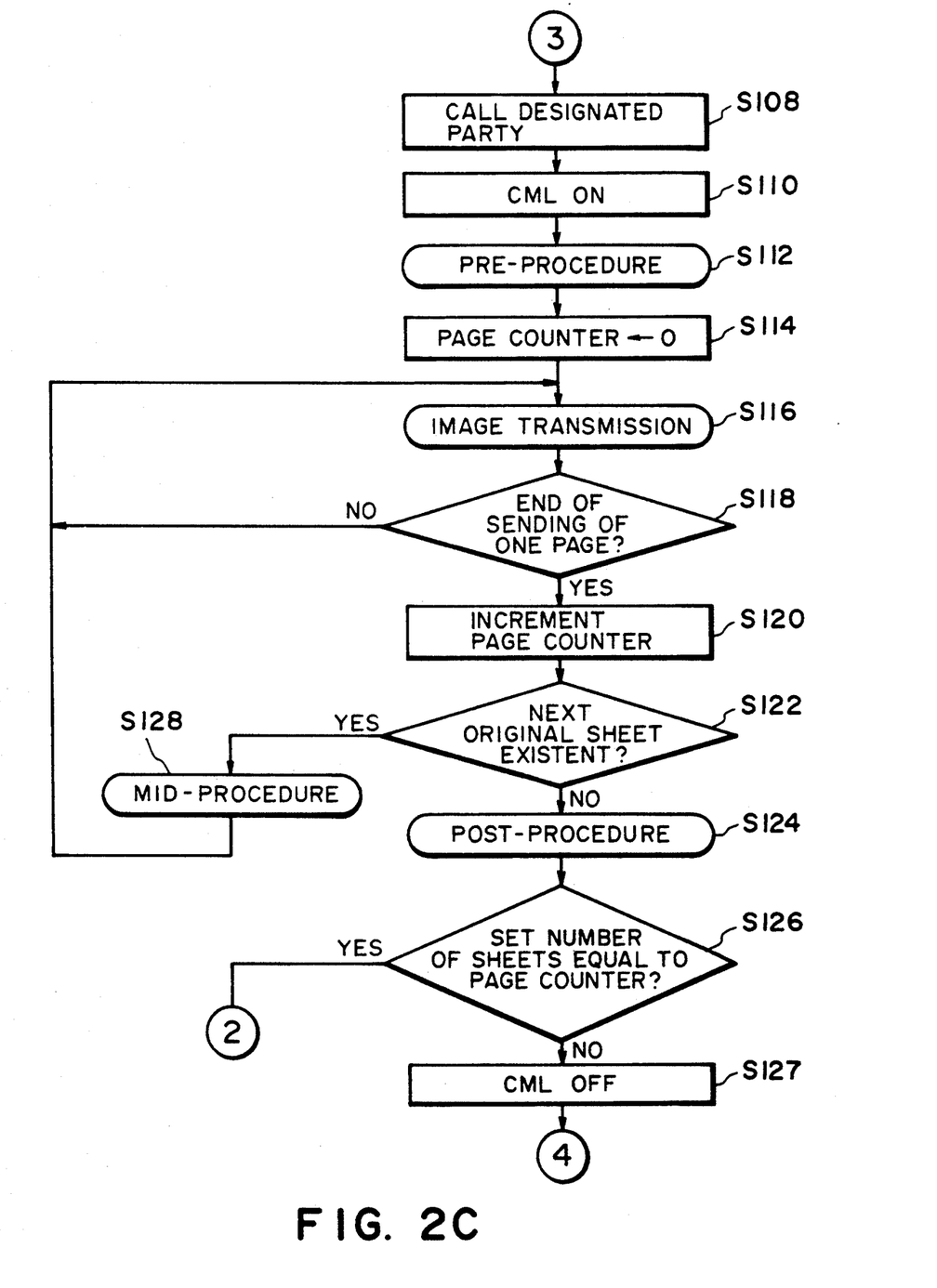

On the other hand, if the number of sheets stored and the number of sheets to be read are equal, the designated In a step S122, whether there exist a next document sheet or not is determined. If it exists, the process proceeds to a step S128 to execute an intermediate procedure. If it does not exist, the process proceeds to a step S124 to execute a post-procedure.

In a step S126, whether the read count set in the step S70 and the count of the page counter (the number of sheets actually transmitted) are equal or not is determined. If they are equal, the process proceeds to the step S52. If they are not equal, a signal having the signal level "0" is sent to the signal line 42a in a step S127 to deactivate the CML relay of the NCU 2 in order to connect the line to the telephone set 4. Then, the process proceeds to a step S102.

In the present embodiment, when the count check mode has been selected and the number of document sheets which the user set and the number of document sheets stored in the memory 11 are not equal, the alarm is generated after the transmission in the direct transmission mode to inform it to the operator. In the memory transmission mode, if the counts are not equal when the read information has been stored in the memory, the alarm is generated and the calling is started.

In the present embodiment, since no call is made in the memory transmission mode if the counts are not equal, a risk of transmitting erroneous information to the destination is avoided.

The multi-address transmission may be considered as a kind of memory transmission, and the same control may be applied.

Where the counts of the document sheets are not equal, the designated destination may be called to inform it to the operator by audio means.

By doing so, in the memory transmission mode, the check function is activated at the end of reading, and if the input read count and the number of sheets actually read are not equal, it can be informed to the operator before calling.

Where the number of sheets which the user set in the read circuit 8 and the number of sheets actually read are not equal, the designated destination may be called and it may be informed to the operator of the destination by audio means after the operator hooked off the handset. For example, the message may be "The read count is not equal."

In order to implement it, the following control may be inserted between the steps S100 and S102 of FIG. 2B.

The destination to be called is read from the destination memory 40, the telephone number of the destination is sent to the signal line 42e, and a call pulse is generated on the signal line 42f to call the destination.

The CML relay of the NCU 2 is activated to connect the facsimile device to the line. After the confirmation of the response by the destination, a pulse is generated on the signal line 42l to generate a sound message of "The read count is not equal" to the user.

Then, the CML relay of the NCU 2 is deactivated to connect the telephone line to the telephone set 4.

In the manner, the user may discuss with the operator of the destination about the retransmission through the manual control by the telephone set 4 or interrupt the transmission.

The present invention is not limited to the above embodiments but various modifications thereof may be made.

I claim:

1. An image transmission apparatus, comprising:
   reading means for reading a document sheet;
   feeding means for sequentially and automatically feeding a plurality of document sheets to said reading means;
   a memory for storing therein image data of the document sheets read by said reading means;
   transmitting means for transmitting the image data from said memory after completion of reading of a plurality of document sheets;
   manual entry means for manually entering a number of document sheets;
   count means for counting the number of document sheets of which images are stored in said memory; and
   means for comparing the number of document sheets entered through said manual entry means and the count of said count means and for generating an alarm in accordance with the comparison result.

2. An image transmission apparatus according to claim 1 wherein the transmission is stopped when the entered number of document sheets and the count are not equal.

3. An image transmission apparatus which sequentially reads a plurality of document sheets, stores image data of the read document sheets in an image memory and transmits the image data form the image memory after completion of reading of a plurality of document sheets, comprising:
   manual entry means for manually entering a number of document sheets;
   count means for counting the number of document sheets of which images are stored in said image memory;
   alarm means for generating an alarm; and
   control means for comparing the number of document sheets entered through said manual entry means and the count of said count means, and causing said alarm means to generate the alarm and stopping the transmission in accordance with the comparison result.

4. An image transmission apparatus according to claim 3 further comprising call means, wherein said control means stops the calling.

5. A method for transmitting an image by reading a plurality of document sheets, storing image data of the document sheets into an image memory and transmitting the image data form said image memory after completion of reading of a plurality of document sheets, comprising the steps of:
   manually entering a number of document sheets;
   counting the number of document sheets of which images are stored in said image memory; and
   comparing the manual entered number of document sheets and the count of the number of sheets of the images; and generating an alarm and stopping transmission when the numbers are not equal.

6. A method for transmitting an image according to claim 5 further comprising the step of stopping calling.

* * * * *

UNITED STATES PATENT AND TRADEMARK OFFICE
CERTIFICATE OF CORRECTION

PATENT NO. : 5,227,894
DATED : July 13, 1993
INVENTOR(S) : TAKEHIRO YOSHIDA

It is certified that error appears in the above-identified patent and that said Letters Patent is hereby corrected as shown below:

COLUMN 1

Line 19, "store" should read --stores--.

COLUMN 2

Line 34, "stat" should read --state--.

COLUMN 8

Line 25, "claim 1" should read --claim 1,--.
    Line 47, "claim 3" should read --claim 3,--.
    Line 52, "form" should read --from--.
    Line 58, "manual" should read --manually--.
    Line 63, "claim 5" should read --claim 5,--.

Signed and Sealed this

Twelfth Day of April, 1994

Attest:

BRUCE LEHMAN

*Attesting Officer*                    *Commissioner of Patents and Trademarks*